Figure 1:
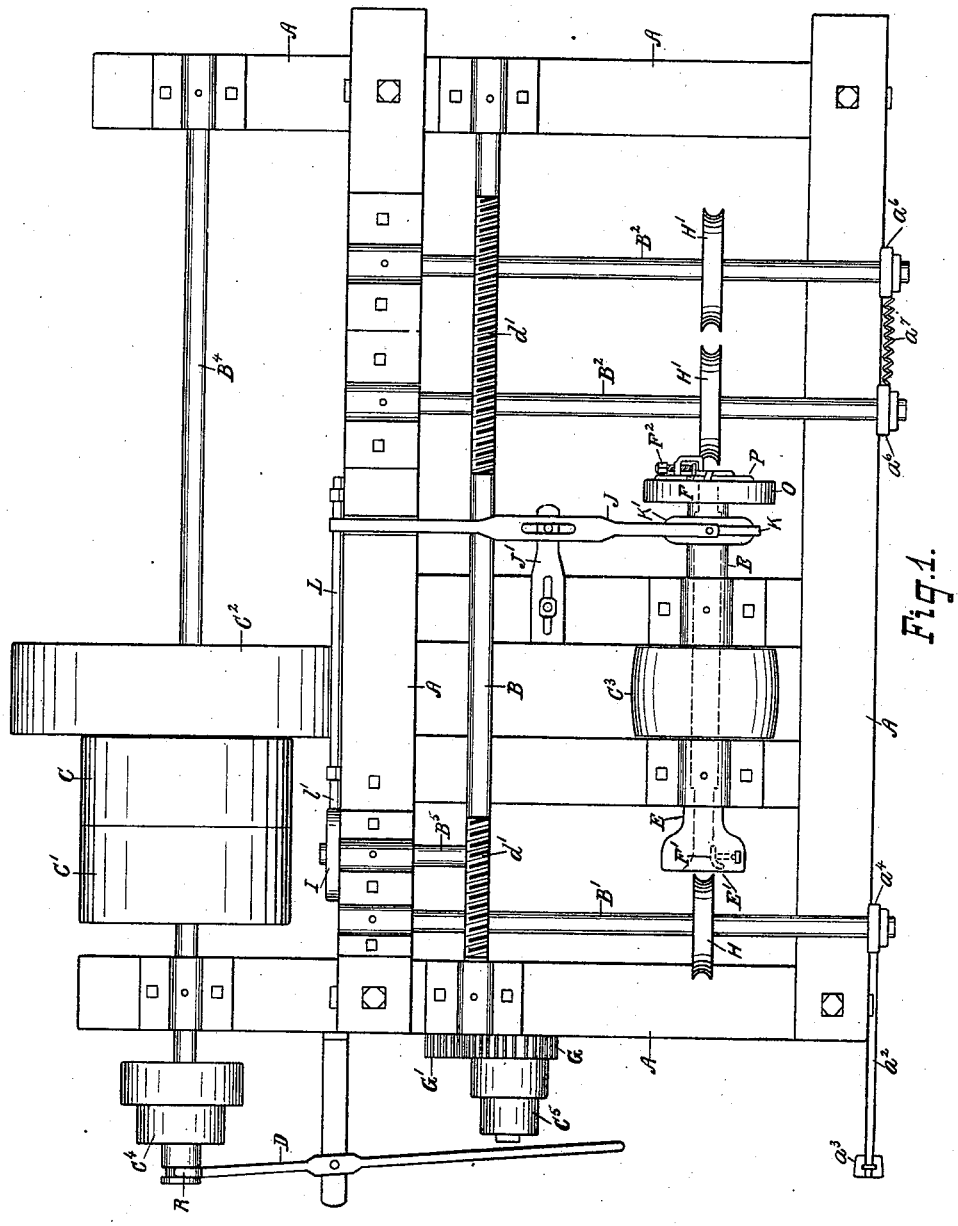

(No Model.)

H. SHELDON.
LATHE FOR TURNING HANDLES.

No. 312,298. Patented Feb. 17, 1885.

Witnesses
A. Edmunds
Carl Hayden

Inventor
Henry Sheldon
By P. J. Edmunds
Attorney (No Model.) 2 Sheets—Sheet 2.
H. SHELDON.
LATHE FOR TURNING HANDLES.
No. 312,298. Patented Feb. 17, 1885.
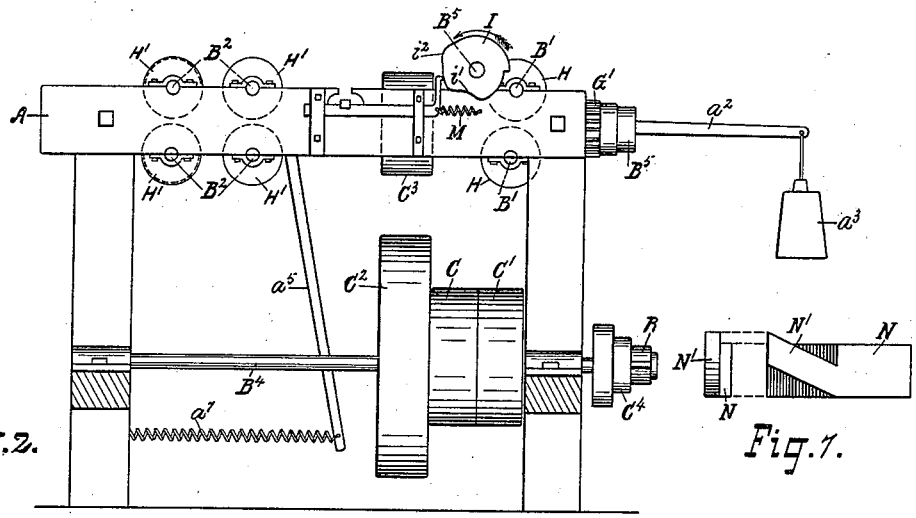
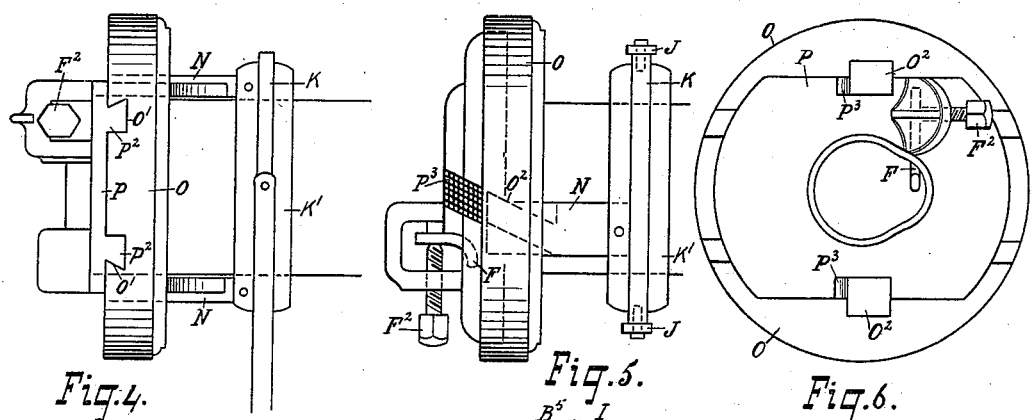
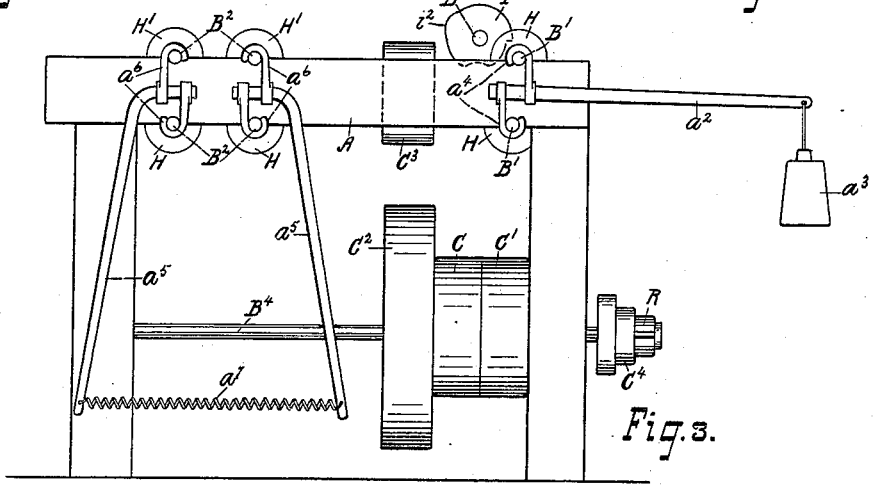
Witnesses
A. Edmunds
Carl Hayden
Inventor
Henry Sheldon
By P. J. Edmunds
Attorney

UNITED STATES PATENT OFFICE.

HENRY SHELDON, OF VIENNA, ONTARIO, CANADA.

LATHE FOR TURNING HANDLES.

SPECIFICATION forming part of Letters Patent No. 312,298, dated February 17, 1885.

Application filed March 13, 1884. (No model.)

*To all whom it may concern:*

Be it known that I, HENRY SHELDON, a subject of the Queen of Great Britain, and a resident of the village of Vienna, in the county of Elgin, in the Province of Ontario, Canada, have invented certain new and useful Improvements on Automatic Handle-Lathes, of which the following is a specification.

This invention relates to a machine for manufacturing in quantities handles for brooms, mops, hoes, rakes, brushes, forks, &c.; and it consists of the improved construction and combination of parts of the same, as will be hereinafter more fully described and claimed, reference being had to the accompanying drawings, wherein—

Figure 1 is a plan view of a machine embodying my invention. Fig. 2 is a side elevation of same on a smaller scale, showing the cam side or handle-shaper. Fig. 3 is a side view of the machine, looking at the side opposite to the cam side. Fig. 4 is an enlarged detail edge view of the slide which holds the shaping or finishing knife and head, looking at the end of the slide. Fig. 5 is an enlarged detail edge view of the slide and head, looking at the side of the slide, and showing the inclined slot by which the slide is operated. Fig. 6 is a plan view of same. Fig. 7 is a detail plan and end view of one of the arms provided with a diagonal flange which operates the slide.

A designates a frame supporting the shafts B B' B² B⁴ B⁵. Motion is communicated to this machine by belt on pulley C, said pulley C being rigidly secured on the shaft B⁴. By shifting the belt on the loose pulley C' the machine is stopped. The lever D moves a clutch, R, provided with two jaws, which fit in two jaws in the cone-pulley C⁴, which starts and stops the revolution of the cone-pulley C⁴ by moving the lever D in or out, and thereby stopping and starting all the feed and shaping mechanism of the machine. The clutch R moves on a sliding key fitting in a groove in the shaft B⁴. The hollow spindle E is revolved by a belt passing over pulleys C² C³, in which spindle E the cutter F' is rigidly secured by a set-screw. The shaft B is revolved by a belt passing over pulleys C⁴ C⁵, and cog-wheel G engaging with cog-wheel G' on said shaft B. Worm-wheels $d'$ on this shaft B engage with worm-pinions on the shafts B', B⁵, and B² to revolve said shafts. As the shafts B' B' revolve, the grooved wheels H H, secured thereon, also revolve and grasp a short bar of wood from a rack at the end of the machine, said bars being fed as required to said grooved wheels H H automatically by a trip, and as the bar of wood from which the handle is to be manufactured passes between these grooved wheels H H it is conducted true into the mouth E' of the spindle E, and as this spindle E revolves, and as the bar of wood passes therein, the cutter F', rigidly secured therein, also revolves, and removes the rough parts of said bar and reduces all the bars to the same size, so that they will pass perfectly free through said spindle E. One end of all the shafts B' and B² are held in place by and revolve in journals secured to the frame A. The opposite ends of the shafts B' are held taut by being grasped by hooks $a^4$, extending from a lever, $a^2$, from which a weight, $a^3$, is suspended, which permits the grooved wheels H H to automatically adjust themselves to different thicknesses of wooden bars. The levers $a^5$, hooks $a^6$, grasping the opposite end of the shafts B², and spring $a^7$ are for the same purpose in regard to said shafts B². They permit the shafts B² to separate, and thereby permit the grooved wheels H' H' to separate to allow the different thickness of the different parts of a handle to pass readily between said grooved wheels H' H'. This worm-wheel $d'$ on this shaft B also engages with worm-pinion on the shaft B⁵, so that as the shaft B revolves the shaft B⁵ also revolves, as well as the cam or handle-shaper I, rigidly secured thereon. The face of this cam I is provided with depressions $i'$ and projections $i^2$, according to the shape of the handle required, a hollow or a projection on the face of the cam I making a corresponding depression or projection on the handle under the process of construction.

J is a forked lever pivoted on the arm J'. The prongs of this lever J clasp and are pivotally secured to a ring, K, fitting in a groove in the face of the ring K', which ring K' encircles the spindle E, and this ring K' moves perfectly free in the ring K, and moves back and forth longitudinally on and revolves with the spindle E.

L is a slide supported in bearings on the frame A. One end, $l'$, of this slide L is held against the face of the cam I by a spring, M, and this slide L is connected near the other end to the lever J, so that as the end of the slide L passes into the depressions $i'$ or over the projections $i^2$ on the face of the cam I the ring K' is moved back and forth, and the arms N N, rigidly secured thereto, are moved back and forth in the head O and slide P, to which slide P the cutter or shaping knife F is rigidly secured. The cutter or shaping knife F is held on the slide P by a set-screw, $F^2$, and this slide P is provided with dovetail-flange runners $P^2$, which fit free in dovetail grooves O' in the head O. The arms N N pass longitudinally through slots $O^2$ in the head O. The diagonal flange N' only fits in slot $P^3$ of slide P. As these diagonal flanges N' N' on the arms N N move back and forth in the slots $O^2$ and $P^3$ of the head O and slide P, respectively, the head O being stationary, and the dovetail-flanged runners $P^2$, which secure the slide P in the dovetail grooves O' in the said head O, permitting the slide P to move to or from the center of the head O when operated by the flanges N' of the arms N. As the end of the lever L moves in the depressions and out over the projections on the face of the cam I, the diagonal flanges N' N' on the arms N N move back and forth in the diagonal slots in the slide P through their connecting mechanism, and thereby move the said slide P, to which the cutter F is attached, to or from the center of the hollow space in the spindle E, through which the bar of wood from which the handle is to be manufactured passes, and as the cutter F, rigidly secured on the slide P, moves to or from the center of the hollow space in the spindle E, according as the depressions or projections are arranged on the face of the cam I, it cuts and removes the wood and shapes the handle automatically. All that is necessary is to insert the short bars of wood, from which the handles are to be manufactured, in succession between the grooved wheels H H, and, the machine being regulated to manufacture a handle at each revolution of the cam I, handles of any size or shape may be manufactured by forming depressions or projections on the cam, I, according to the depressions or projections required on the handle.

Having thus described my invention, I claim—

In an automatic handle-lathe, the combination of the head O, provided with dovetail grooves O' and slots $O^2$, with the slide P, provided with dovetail-flange runners $P^2$, and diagonal slots $P^3$, and grooved ring K', ring K, arms N N, provided with diagonal flanges N' N', and the knife F, operated by suitable operating mechanism, substantially as shown and described, and for the purpose specified.

In testimony whereof I affix my signature in the presence of the two undersigned witnesses.

HENRY SHELDON.

Witnesses:
P. J. EDMUNDS,
A. EDMUNDS.